(12) United States Patent
Oberste et al.

(10) Patent No.: US 11,111,626 B2
(45) Date of Patent: Sep. 7, 2021

(54) INTERLACED THREE-DIMENSIONAL PRINTED COMPOSITES AND MACHINES FOR FABRICATING SAME

(71) Applicant: Georgia Tech Research Corporation, Atlanta, GA (US)

(72) Inventors: Christopher Marc Oberste, Atlanta, GA (US); Ben Wang, Atlanta, GA (US); Kan Wang, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 372 days.

(21) Appl. No.: 15/788,061

(22) Filed: Oct. 19, 2017

(65) Prior Publication Data
US 2018/0038045 A1    Feb. 8, 2018

Related U.S. Application Data

(62) Division of application No. 14/821,502, filed on Aug. 7, 2015, now Pat. No. 9,809,926.

(60) Provisional application No. 62/034,930, filed on Aug. 8, 2014.

(51) Int. Cl.
| | |
|---|---|
| *D03D 15/00* | (2021.01) |
| *D06M 15/53* | (2006.01) |
| *B29C 70/24* | (2006.01) |
| *D03D 41/00* | (2006.01) |
| *D03D 47/27* | (2006.01) |

(52) U.S. Cl.
CPC ............ *D06M 15/53* (2013.01); *B29C 70/24* (2013.01); *D03D 41/00* (2013.01); *D03D 41/004* (2013.01); *D03D 47/273* (2013.01); *D10B 2101/12* (2013.01); *D10B 2505/02* (2013.01)

(58) Field of Classification Search
CPC ........................................................ D03D 15/00
See application file for complete search history.

(56) References Cited

U.S. PATENT DOCUMENTS

| | | | | |
|---|---|---|---|---|
| 3,634,827 A | * | 1/1972 | Lourie | D03C 19/005 700/131 |
| 4,871,491 A | * | 10/1989 | McMahon | A63B 51/02 264/29.2 |
| 5,302,419 A | * | 4/1994 | Muzzy | B29C 70/20 427/185 |
| 5,344,687 A | * | 9/1994 | Grimnes | B29C 70/08 428/102 |
| 5,983,952 A | * | 11/1999 | Carpenter | D03D 51/02 139/1 R |
| 8,129,294 B2 | | 3/2012 | Khokar | |

(Continued)

*Primary Examiner* — Andrew T Piziali
(74) *Attorney, Agent, or Firm* — Troutman Pepper LLP; Ryan Schneider; Dustin Weeks

(57) ABSTRACT

A machine for fabricating three-dimensional interlaced composite components including a frame, a deposition surface, a first set of two or more warp heads, a second set of two or more of warp heads, and a weft inserter. An interlaced composite component including a first set of two or more warp filaments parallel to each other and a first set of two or more weft filaments parallel to each other. Warp filaments are interlaced with, and bonded to, weft filaments. Warp filaments and weft filaments are interlaced in at least two different weave patterns. Warp filaments and weft filaments are continuous, and the weave patterns transition from one pattern to another.

21 Claims, 13 Drawing Sheets

(56) References Cited

U.S. PATENT DOCUMENTS

| | | | |
|---|---|---|---|
| 2005/0085147 A1* | 4/2005 | Homma | B29C 70/22 |
| | | | 442/218 |
| 2008/0286578 A1* | 11/2008 | Tilbrook | C08J 5/24 |
| | | | 428/413 |
| 2013/0210299 A1* | 8/2013 | Zhang | C23C 28/345 |
| | | | 442/6 |
| 2014/0261988 A1 | 9/2014 | Stewart-Irvin et al. | |
| 2016/0097155 A1* | 4/2016 | Fan | D06M 15/643 |
| | | | 442/88 |

* cited by examiner

INTERLACED THREE-DIMENSIONAL PRINTED COMPOSITES AND MACHINES FOR FABRICATING SAME

CROSS-REFERENCE TO RELATED APPLICATIONS

This application is a divisional of U.S. patent application Ser. No. 14/821,502, filed 7 Aug. 2015, which application claims priority to U.S. Provisional Patent Application No. 62/034,930 filed 8 Aug. 2014, the entire contents and substance of each hereby incorporated by reference.

BACKGROUND OF THE INVENTION

1. Field of the Invention

The disclosure relates to the field of composite materials. More specifically, the disclosure relates to composites having interlaced fibers in a polymer matrix.

2. Description of Related Art

Polymer composite materials include a matrix material and one or more reinforcing materials. The reinforcing materials enhance the strength and/or stiffness of the product while the polymer matrix allows the composite to be formed in complex shapes. The earliest composite materials were reinforced with paper or cotton fabric. Later polymer composites were reinforced by chopped or broken reinforcing fibers randomly disturbed within the matrix. The discontinuous nature of the reinforcing fibers prevented them from achieving significant reinforcement because the strength between isolated fibers was limited by the strength of the matrix material itself or by the adhesion between the matrix material and the fibers.

Later polymer composites incorporated woven mats of reinforcing fibers. The woven mats allowed the full strength and stiffness of the fibers to be employed when the composite was loaded in tension, and to a lesser extent when loaded in compression and flexion. Woven mats also allowed the strands of the reinforcing fibers to be oriented in the optimal direction, or a combination of directions, depending on the expected loading of the part. However, composites manufactured from woven mats greatly increased manufacturing cost and complexity because the mats generally need to be pre-cut and laid in the mold by hand.

Three-dimensional (3D) printing is the process of creating a finished part by depositing (adding) layer after layer of material, until the desired part is obtained. The oldest form of 3D printing is stereolithography, where a bath of liquid polymer is selectively polymerized at its surface by UV radiation. The solidified polymer is then submerged into the liquid so that additional layers can be built upon the previous layers.

The next major innovation in 3D printing was the development of filament deposition modeling (FDM). FDM melts a polymeric or metallic filament and deposits the molten material in thin layers. FDM is faster than stereolithography and allows a wider variety of printing materials. However, neither FDM printing or stereolithography is well suited to fabricating structural components. The first 3D printing system suitable for the fabrication of structural components was selective laser sintering. In this system, a thin layer of metal powder is deposited onto the print surface and selectively sintered by a laser. Another layer of powder is applied over the previously sintered layer, and the process is repeated, so that the second layer is sintered to the first. While these sintered metal components fabricated are suitable for structural applications, their relatively high density makes them unsuitable for some application. Various attempts have been made to adapt FDM printing to create structural composites by adding reinforcement fibers into the polymer filament. While this does improve the mechanical properties, the strength of the fabricated components remains insufficient for use in high-performance applications.

Automated tape placement is a highly precise process for creating composites from unidirectional pre-impregnated textiles (prepreg) textiles. It can be thought of as a more advanced version of the hand lay-up FRP processes, where the human operator is replaced by a robot. This permits very precise fiber placement, but it can only be used on relatively simple curvilinear surfaces. Composites fabricated by automated tape placement are cured by the same methods as hand lay-up.

SUMMARY OF THE INVENTION

In a first exemplary embodiment of the present invention, a machine for fabricating three-dimensional interlaced composite components is disclosed, comprising a frame, a deposition surface, a first set of two or more warp heads adapted to deposit a first set of warp filaments on the deposition surface in a first warp direction and move parallel to one another within a first plane, a second set of two or more of warp heads adapted to deposit a second set of warp filaments on the deposition surface in a second warp direction and move parallel to one another within the first plane, wherein the second set of warp heads do not move collinearly with the first set of warp heads, and a weft inserter adapted to deposit a set of weft filaments on the deposition surface in a weft direction and traverse a length of the deposition surface in the warp direction, wherein the weft direction is different than at least one of the first and second warp directions.

One or more of the first set warp heads, the second set warp heads, and the weft inserter can be supported by the frame. The deposition surface can be supported by the frame.

The first warp direction can be the same as the second warp direction. The first warp direction can be different than the second warp direction. The weft direction can be different than both the first and second warp directions.

The weft inserter can comprise a rapier weft inserter comprising a linear element that extends over the deposition surface.

The weft inserter can comprise an air-jet weft inserter comprising a compressed air supply, at least one compressed air control valve, a filament cutter, and a nozzle.

The machine can further comprise a filament cutter.

The deposition surface can be adapted to move linearly in a vertical direction along a vertical axis. The deposition surface can be adapted to rotate in a plane normal a vertical axis. The deposition surface can be adapted to both move linearly in a vertical direction along a vertical axis and rotate in a plane normal the vertical axis.

The machine can further comprise a third set of two or more warp heads adapted to deposit warp filaments on the deposition surface in a third warp direction and move parallel to one another and collinearly with the first set of warp heads, and a fourth set of two or more warp heads adapted to deposit warp filaments on the deposition surface in a fourth warp direction, and move parallel to one another collinearly with the second set of warp heads.

One or both the third set warp heads and the fourth set warp heads can be supported by the frame.

In another exemplary embodiment, the present machine can fabricate a three-dimensional interlaced composite by depositing onto the deposition surface the first set warp filaments, inserting, on top of the first set of warp filaments, a first set of weft filaments, depositing, on top of the first set of weft filaments, the second set of warp filaments, and inserting, on top of the second set of warp filaments, a second set of weft filaments, wherein the three-dimensional interlaced composite is formed when at least one of the warp filaments passes over at least one of the weft filaments and passes under at least another of the weft filaments.

In another exemplary embodiment, a three-dimensional interlaced composite can be fabricated by the present machine and comprise the first set warp filaments and the first set weft filaments.

In another exemplary embodiment, the present invention is an interlaced composite component comprising a first set of two or more warp filaments parallel to each other and a first set of two or more weft filaments parallel to each other, wherein at least a portion of the warp filaments of the first set of warp filaments are interlaced with, and bonded to, at least a portion of the weft filaments of the first set of weft filaments, wherein at least a portion of the warp filaments and at least a portion of the weft filaments are interlaced in at least two different weave patterns selected from the group consisting of plain weave, twill weave, and satin weave, and wherein at least a portion of the warp filaments and at least a portion of the weft filaments are continuous and the weave patterns transition from one pattern to another.

At least a portion of the warp filaments can comprise reinforcing fibers bonded to a polymer matrix. At least a portion of the warp filaments can comprise reinforcing fibers pre-impregnated with thermoplastic resin. At least a portion of the warp filaments and at least a portion of the weft filaments can comprise comingled reinforcing fibers and thermoplastic fibers.

The interlaced composite component can further comprise a second set of two or more warp filaments parallel to each other and a second set of two or more weft filaments parallel to each other, wherein at least a portion of the weft filaments of the first set of weft filaments are parallel to one other and substantially coplanar, wherein at least a portion of the weft filaments of the second set weft filaments are parallel to one other, substantially coplanar, and positioned either above or below at least a portion of the first set of weft filaments, wherein at least a portion of the warp filaments of the first set of warp filaments alternate between being interlaced with, and bonded to, at least a portion of the weft filaments of the first set of weft filaments and at least a portion of the weft filaments of the second set of weft filaments, and wherein at least a portion of the warp filaments of the second set of warp filaments alternate between being interlaced with, and bonded to, at least a portion of the weft filaments of the first set of weft filaments and at least a portion of the weft filaments of the second set of weft filaments.

At least a portion of the warp filaments of the second set of warp filaments and at least a portion of the weft filaments of the second set of weft filaments can be interlaced in at least two different weave patterns selected from the group consisting of plain weave, twill weave, and satin weave, and at least a portion of the warp filaments of the second set of warp filaments and at least a portion of the weft filaments of the second set of weft filaments can be continuous and the weave patterns transition from one pattern to another.

In another exemplary embodiment, the present invention is an interlaced composite component comprising a first set of two or more warp filaments parallel to each other and a first set of two or more weft filaments parallel to each other, wherein at least a portion of the warp filaments of the first set of warp filaments are interlaced with, and bonded to, at least a portion of the weft filaments of the first set of weft filaments, wherein at least a portion of adjacent warp filaments of the first set of warp filaments are separated from one another by a warp gap, wherein at least a portion of adjacent weft filaments of the first set of weft filaments are separated from one another by a weft gap, and wherein the warp and weft gaps define one or more openings in the composite component.

The interlaced composite component can further comprise a thermoplastic polymer, wherein the thermoplastic polymer is molded over the interlaced composite component.

The thermoplastic polymer can be reinforced with a discontinuous fiber.

In another exemplary embodiment, a method is described for producing an interlaced composite. The method includes: depositing onto a deposition surface a first one or more warp filaments in a first linear direction, inserting, on top of the first one or more warp filaments, a first one or more weft filaments in a second linear direction, where the second direction is in the same plane as the first one or more warp filaments but is not parallel to the direction of the first one or more warp filaments, depositing, on top of the one or more first weft filaments, one or more second warp filaments in first linear direction, where the second one or more warp filaments are not collinear with the first one of more warp filaments, and inserting, on top of the second one or more warp filaments, a second one or more weft filaments in the second direction.

In another exemplary embodiment, a machine for fabricating three-dimensional interlaced composite components is disclosed. The machine includes a frame, a print plate supported by the frame, a first plurality of warp heads supported by the frame, which deposit filaments on a print plate and move parallel to each other within a first plane. The machine also includes a second plurality of warp heads supported by the frame which also deposit filaments on the print plate and move parallel to each other within the first plane and which do not move coaxially with any of the first plurality of warp heads. The machine also includes a weft inserter, supported by the frame, which deposits weft filaments on the print plate in a different direction than the first and second plurality of warp heads and traverses the length of the print plate in the same directions as the first and second plurality of warp heads.

In another exemplary embodiment, a composite component structure is disclosed that has a plurality of warp filaments interlaced with, and bonded to, a plurality of weft filaments, where the warp filaments are parallel to each other and include one or more reinforcing fibers bonded to a polymer matrix. The weft filaments are parallel to each other and include one or more reinforcing fibers bonded to a polymer matrix. The plurality of weft filaments and the plurality of weft filaments are interlaced in at least two of the following weaving patterns: twill weave, and satin weave. The filaments of the plurality of weft filaments and the filaments of the plurality of weft filaments are continuous where the weaving patterns transition from one pattern to another.

These and other objects, features and advantages of the present invention will become more apparent upon reading the following specification in conjunction with the accompanying drawing figures.

DETAIL DESCRIPTION OF THE INVENTION

Figure 1:
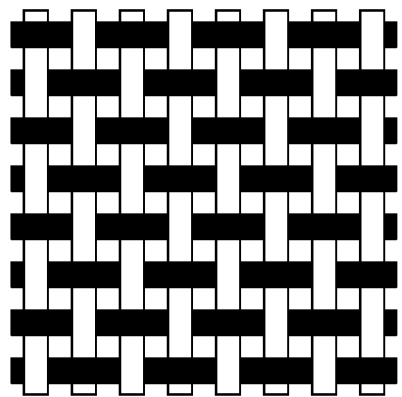
FIG. 1 is a diagram of a plain weave illustrating the interlacing of warp and weft filaments in accordance with the present disclosure.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways.

As used in the specification and the appended Claims, the singular forms "a," "an" and "the" include plural references unless the context clearly dictates otherwise. For example, reference to a component is intended also to include a composition of a plurality of components. References to a composition containing "a" constituent is intended to include other constituents in addition to the one named.

In describing exemplary embodiments, terminology will be resorted to for the sake of clarity. It is intended that each term contemplates its broadest meaning as understood by those skilled in the art and includes all technical equivalents that operate in a similar manner to accomplish a similar purpose.

Ranges may be expressed as from "about" or "approximately" or "substantially" one value and/or to "about" or "approximately" or "substantially" another value. When such a range is expressed, other exemplary embodiments include from the one value and/or to the other value.

Similarly, as used herein, "substantially free" of something, or "substantially pure", and like characterizations, can include both being "at least substantially free" of something, or "at least substantially pure", and being "completely free" of something, or "completely pure".

"Comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

The characteristics described as defining the various elements of the invention are intended to be illustrative and not restrictive. For example, if the characteristic is a material, the material includes many suitable materials that would perform the same or a similar function as the material(s) described herein are intended to be embraced within the scope of the invention. Such other materials not described herein can include, but are not limited to, for example, materials that are developed after the time of the development of the invention.

As used herein, "warp" refers to parallel filaments deposited along the primary direction of deposition within a plane.

As used herein, "weft" refers to any filaments deposited along any axis not parallel to the primary direction of deposition within a plane.

As used herein, "plane" refers to the thickness of interlaced composite generated during a single pass of the deposition system.

As used herein, "deposition" refers to adding composite filaments to a composite structure in a controlled fashion and pattern.

As used herein, "composite" refers to a combination of two or more materials differing in form or composition on a macro scale. As used herein, a composite includes, at least, a composite matrix binder and reinforcing elements. The composite constituents do not dissolve or merge completely into one another although they act in concert.

As used herein, "filament" refers to an element including resin and having length much greater than its width or diameter. In an exemplary embodiment, a filament also includes one or more reinforcing fibers.

As used herein, "resin" refers to an isotropic material used as a matrix binder within a composite.

As used herein, "thermoset" refers to a polymer which solidifies from a liquid form during processing due to an irreversible chemical reaction.

As used herein, "thermoplastic" refers to a polymer which solidifies from a molten form during processing due to freezing.

As used herein, "engineering polymer" refers to polymers having at least one mechanical, thermal, or electrical material property which is superior to "bulk" polymers such as polyethylene (PE). Examples of engineering polymers include, but are not limited to, nylon (PA), polycarbonate (PC), acetal (PMA), polyetheretherketone (PEEK), poly(p-phenylene sulfide)(PPS), and polyetherketoneketone (PEKK).

As used herein, "sizing" refers to pre-coating a reinforcing fiber with another substance to change its properties during processing.

An FRP composite can be made by laminating layers of unidirectional fibers. However, a more balanced composite is created by interlacing non-parallel filaments to create a woven structure. For example, in orthogonal textiles, interlacing the warp and weft yarns generates crimp, or curvature, in the yarns, which affects the overall mechanical properties of the textile. Similar effects are observed in the mechanical properties of composites based on interlaced reinforcing fibers. Woven structures can be classified by fabric geometry into the categories of plain weave, twill weave, and satin weave textiles.

Referring now to the Figures, in which like reference numerals represent like parts, various embodiments of the disclosure will be disclosed in detail. FIG. 1 is an illustration of a plain weave. A plain weave is the simplest form of textile geometry, comprising a repeat structure where the warp fiber passes over one weft yarn and under another weft yarn. Plain weave fabrics have the lowest in-plane stiffness and highest in-plane shear stiffness of any regular fabric geometry, due to the presence of a high degree of crimp.

Figure 2:
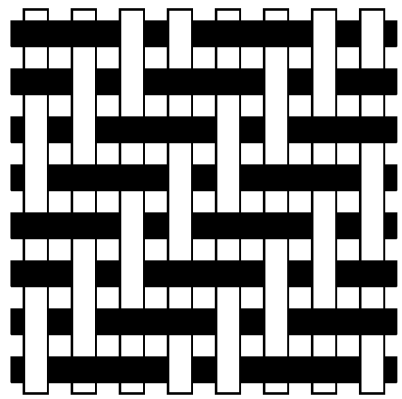
FIG. 2 is a diagram of a twill weave illustrating the interlacing of warp and weft filaments in accordance with the present disclosure.

FIG. 2 is an illustration of a twill weave. Twill weave fabrics possess a repeat structure where the warp yarn passes over two or three weft yarns before passing under one, two, or three weft yarns. This results in the formation of a very characteristic diagonal line. Twill weaves possess moderate in-plane stiffness and shear stiffness.

Figure 3:
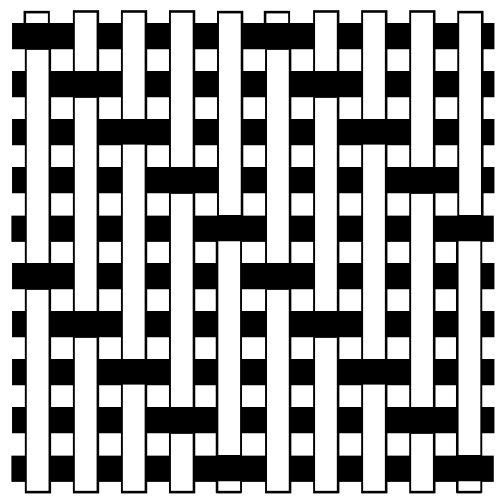
FIG. 3 is a diagram of a satin weave illustrating the interlacing of warp and weft filaments in accordance with the present disclosure.

FIG. 3 is an illustration of a satin weave. The satin weave is the best textile structure for in-plane stiffness, due to the very low crimp inherent to these weaves. In a satin weave, the warp yarn runs over four or more weft yarns before interlacing with a weft yarn. While the low degree of crimp is good for in-plane stiffness, the lower level of interlacing between adjacent yarns translates to low in-plane shear strength.

Deposition Sequence

The deposition process comprises at least of depositing a continuous filament in a sequence of short segments of two or more groups of warp filaments interspersed with depositing intervening weft filaments. In an exemplary embodiment, enough warp filaments are deposited to substantially cover the width of the composite component may be deposited. The length of the warp segments is determined by the desired pitch of the weft. For clarity and brevity in this section, the warp segments are referred to as "[numeral] segment, [numeral] [type] group." For example, the first segment of the first group of warp filaments is referred to as "first segment, first warp group."

Figure 4:
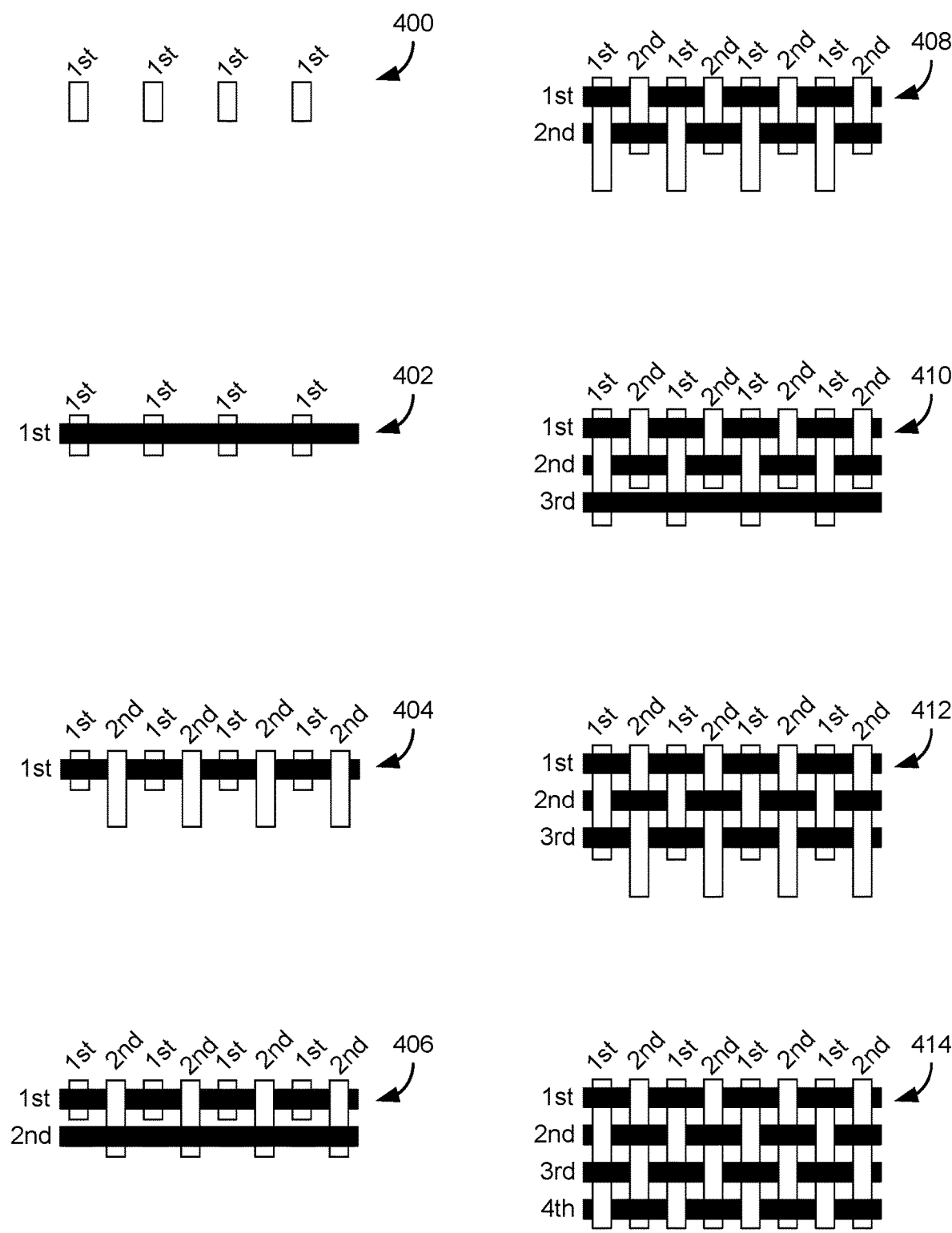
FIG. 4 is a sequence of diagrams illustrating the deposition process for a simple 1/1 plain weave in accordance with the present disclosure.

FIG. 4 illustrates the deposition process for a simple 1/1 plain weave. The deposition process begins with deposition of the first segment, first warp group 400. The first weft filament is then deposited 402 on top of the first segment, first warp group. The first segment, second warp group is then deposited 404 on top of the first weft filament and next to the first segment, first warp group. In most embodiments, the first segment, second warp group deposits are at least twice as long as the first segment, first warp group deposits. The second weft filament is then deposited 406 on top of the first segment, second warp group. This is followed by the second segment, first warp group 408 over the second weft filament. This is followed by the third weft filament 410 on top of the second segment, first warp group. The second segment, second warp group is then deposited 412 over the third weft filament, and the process repeats 414 until the entire first layer of the part is made. When the entire first layer of the part is complete, the warp filaments are cut and fabrication of the next layer of the part begins the same way. Persons having ordinary skill in the art will understand that a similar process will be used to deposit other types of plain-weave composites. Examples include, but are not limited to, plain-weave composites having more than one warp filament interlaced with the weft (e.g. "duck" weave having two warp filaments interlaced with one weft filament), or vice-versa.

Figure 5:
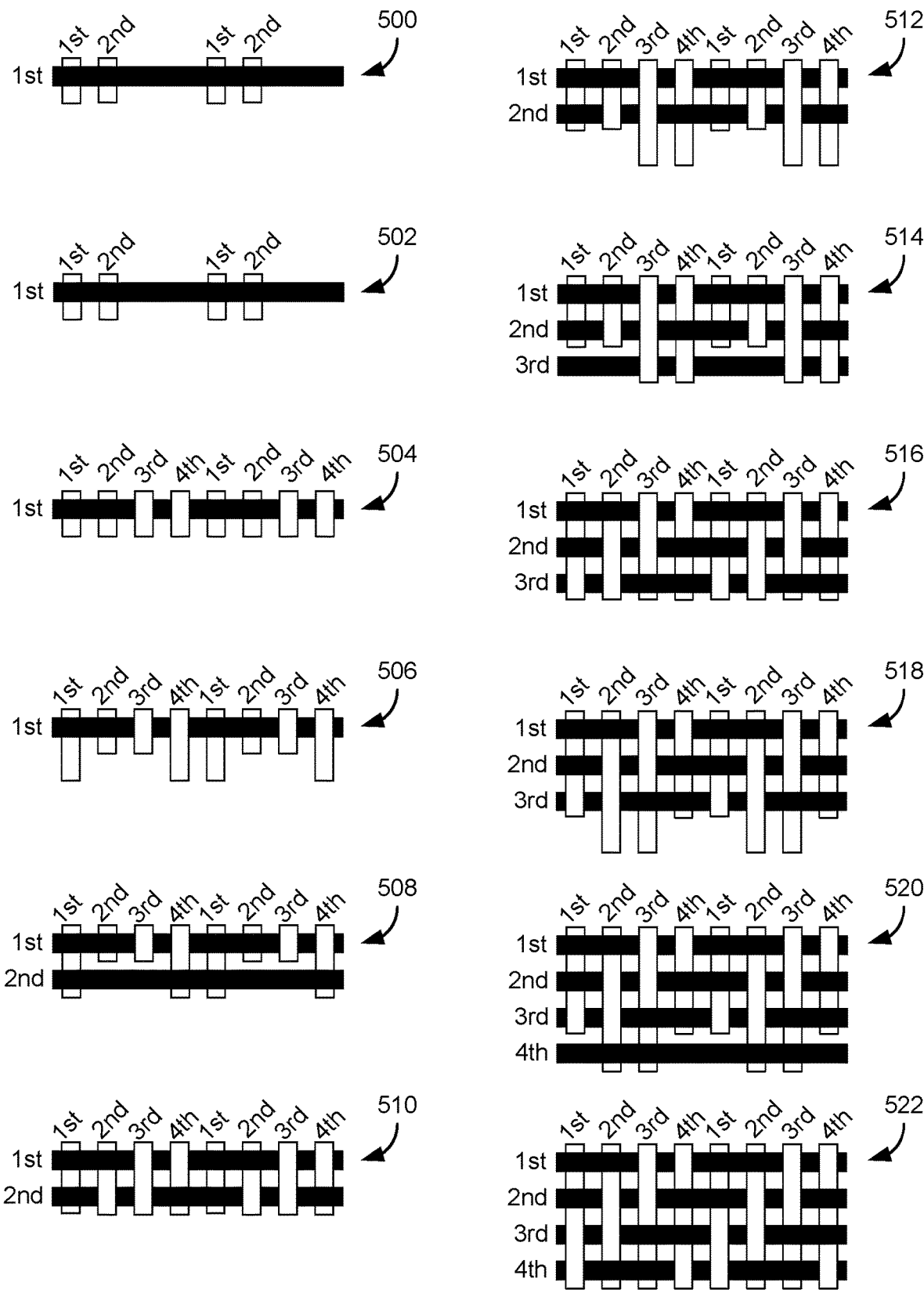
FIG. 5 is a sequence of diagrams illustrating the deposition sequence for a 2/2 twill weave in accordance with the present disclosure.

More complicated weaving patterns may require more than two groups of warp filaments. For a particular weaving pattern, the minimum number of warp groups is equal to the maximum number of warp filaments the weft will pass over plus the maximum number of warp filaments the weft will pass under. For example, FIG. 5 illustrates the deposition sequence for a 2/2 twill weave. The process begins with the first segment, first warp group and first segment, second warp group being deposited together 500, followed by the first weft filament 502. This is followed by the first segment, third warp group and first segment, fourth warp group being deposited together 504. Then the second segment, first warp group and second segment, fourth warp group are deposited together 506, followed by the second weft filament 508. Then the second segment, second warp group and second segment, third warp group are deposited together 510. This is followed by the third segment, third warp group and third segment, fourth warp group being deposited together 512, followed by the third weft filament 514. Then the third segment, first warp group and third segment, second warp group are deposited together 516, followed by the fourth segment, second warp group and fourth segment, third warp group 518. The fourth weft filament is then deposited 520, followed by the fourth segment, first warp group and fourth segment, fourth warp group 522. This completes the pattern for a 2/2 twill, which then repeats. Persons having ordinary skill in the art will understand that a similar process will be used to deposit other types of twill-weave composites. Examples include, but are not limited to, 1/2, 1/3, 2/1, 3/1, and 3/3 twill-weave composites.

Figure 6:
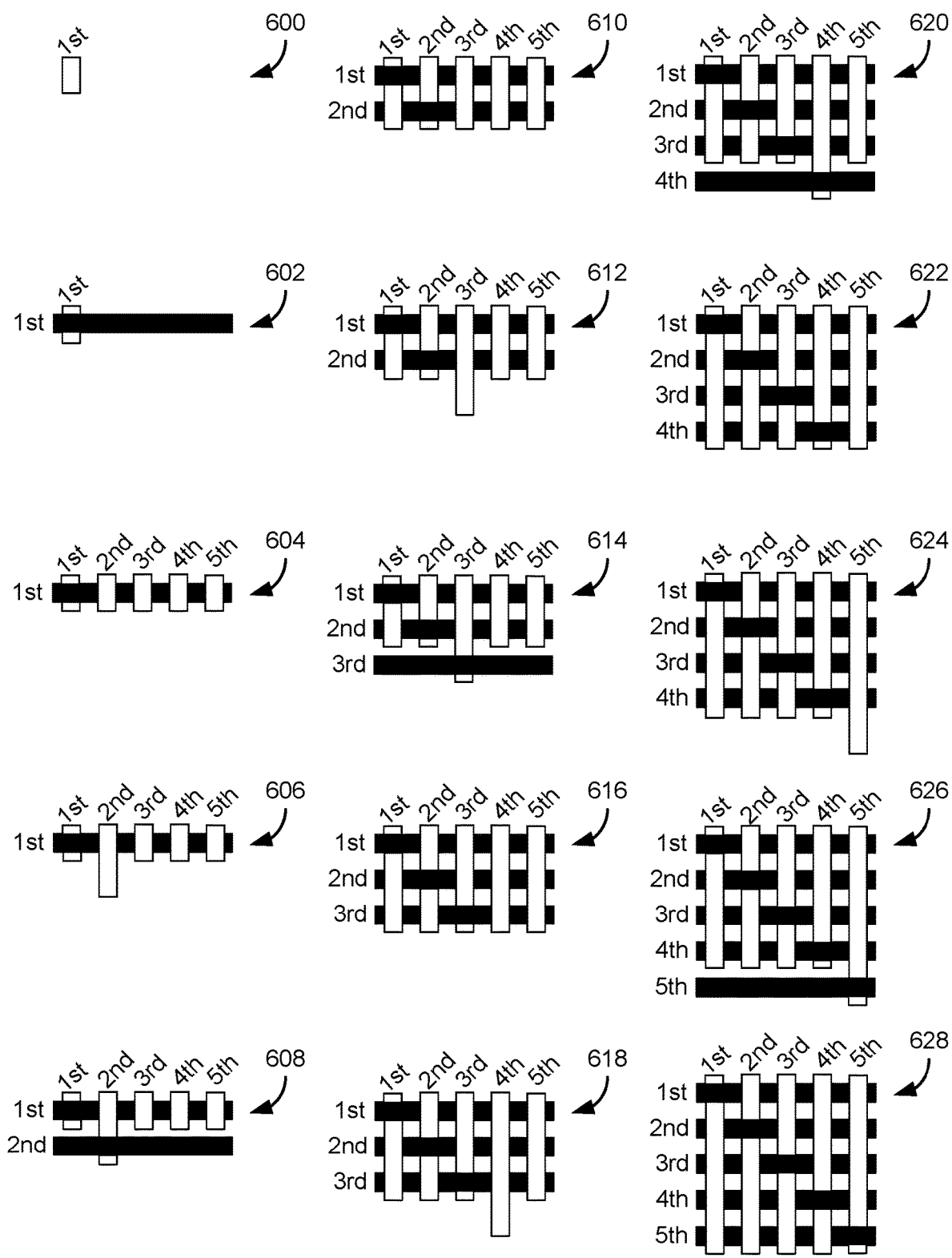
FIG. 6 is a sequence of diagrams illustrating the deposition sequence for a 1/4 satin-weave composite in accordance with the present disclosure.
Figure 7:
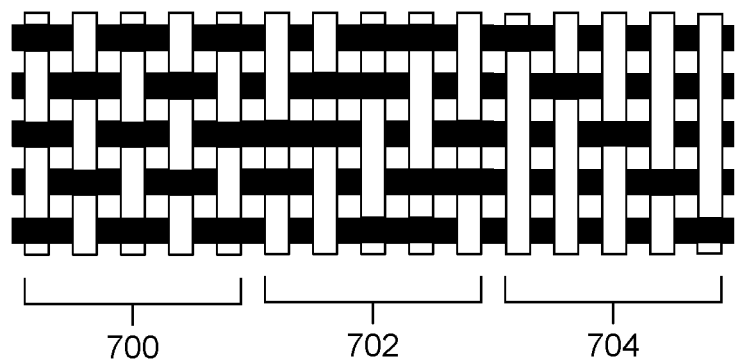
FIG. 7 is a diagram of a composite which integrates three different weaves within the same interlaced structure, in accordance with the present disclosure, to provide different material properties in different locations.

FIG. 6 illustrates the deposition sequence for a 1/4 satin-weave composite. At 600, the first segment, first warp group is deposited. At 602, the first weft filament is deposited. At 604, the first segments, second, third, fourth, and fifth warp groups are deposited. At 606, the second segment, second warp group is deposited. At 608, the second weft filament is deposited. At 610, the second segments, first, third, fourth, and fifth warp groups are deposited. At 612, the third segment, third warp group is deposited. At 614, the third weft filament is deposited. At 616, the third segments, first, second, fourth, and fifth warp groups are deposited. At 618, the fourth segment, fourth warp group is deposited. At 620, the fourth weft filament is deposited. At 622, the fourth segments, first second, third, and fifth warp groups are deposited. At 624, the fifth segment, fifth warp group is deposited. At 626, the fifth weft filament is deposited. At 628, the fifth segments, first, second, third, and fourth warp groups are deposited. Persons having ordinary skill in the art will understand that a similar process will be used to deposit other types of satin-weave composites. Examples include, but are not limited to, 1/5, 1/6, 4/1, 5/1, etc. satin-weave composites In some embodiments, the deposition sequence can also be tailored to produce different weaving patterns at different locations within the same plane of a single interlaced composite structure. Neither hand-layup FRP nor automated tape-placement machines can achieve this effect. FIG. 7 illustrates a composite which integrates three different weaves within the same interlaced structure to provide different material properties in different locations. The weave in FIG. 7 transitions from a plain weave 700 to a twill weave 702 to a satin weave 704. As the weave within the layer transitions from plain weave 700 to satin weave 704, the shear strength will decrease and the in-plane strength will increase. The same is true for stiffness and impact resistance.

In some embodiments, multiple layers can be deposited at the same time. In these embodiments, a first two more groups of warp filaments and a weft filament are deposited in the manner described above. However, before advancing to the next weft filament in that layer, a second two or more additional groups of warp are deposited on top of the layer, along with another weft filament, creating two layers of interlaced composite. The number of layers which can be deposited at once is only limited by the sophistication of the deposition machine and the number of warp groups available. In some embodiments, this technique can also interlace warp filaments between layers. Using the two-layer example described above, the warp groups would alternate between which layer was deposited first for each weft location. Thus, after the first weft location, at the next weft location the second two or more warp groups and their weft filament deposit first, followed by the first two or more warp groups and their weft filament. In this way, the first two or more warp groups are now in the upper layer and the second two or more warp groups are in the lower layer.

Figure 8:
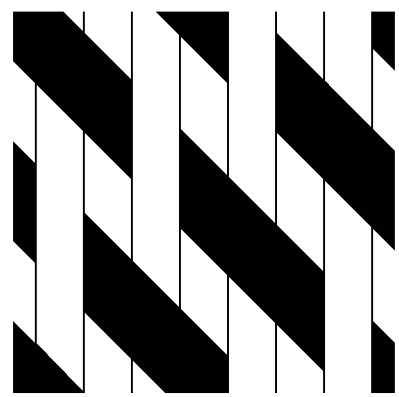
FIG. 8 is a diagram of a plain weave where the warp and weft are not orthogonal to each other in accordance with the present disclosure.

In most embodiments, the warp and weft are orthogonal to each other. However, in some embodiments, favorable material properties may be achieved by creating a smaller angle (less than 90°) between the warp and weft. For example, FIG. 8 illustrates a plain weave where the warp and weft are at a 45° to each other.

In some embodiments, the gaps between filaments may be filled in with additional resin as a post-processing operation. In other embodiments, the filaments may be spaced closely enough together to fuse together during deposition to create a void-free layer. In further embodiments, the filaments may be spaced closely enough together during deposition that a post-processing step can eliminate any gaps. For example, the final part may be removed, heated, and compressed to re-flow the matrix of the filaments, causing it to fill in the gaps and expel any gasses trapped in the gaps.

However, in some embodiments, the gaps may be intentionally left in place to reduce density and crack propagation. For example, in some combinations of resin and fiber, filling the gaps may reduce the strength and/or impact resistance of the final composite part because filling the gaps with resin promotes crack propagation. In some embodiments, the strength and impact resistance of the final part may be especially sensitive to cracks near the interface between the resin and the reinforcing fiber. In these embodiments, leaving the gaps empty may eliminate a pathway for cracks to propagate to this interface, resulting in superior mechanical properties. In other embodiments, leaving the gaps empty may improve the buckling resistance of the filaments and correspondingly improve the overall compressive strength of the part. In these embodiments, the high interfacial strength resulting from allow the gaps to remain allows the fibers to act as reinforced columns of resin where the reinforcing fiber acts as "rebar."

Filament Design

In an exemplary embodiment, the filament includes a high-performance reinforcing yarn coated with a polymer resin to create a composite filament. In some embodiments, the polymer is an engineering polymer. In an exemplary embodiment, the resin is polyetherketoneketone (PEKK).

Several mechanical and processing parameters are relevant to the processing behavior and final mechanical properties of the composite, including melt viscosity, melt temperature, stiffness, toughness, density, and chemical and thermal stability. Because the reinforcing fibers provide most of the strength and stiffness in the resulting composite, an appropriate fiber should be selected for the composite filament to achieve optimal performance. In some embodiments, the interface between resin and the reinforcing fiber has the strongest influence on the composite's properties. If the interface is weak, the fiber will pull out of the matrix and fail to carry load, resulting in a lower overall composite strength. Therefore, in some embodiments, surface modification (e.g. etching, sizing) of the fiber may be required for the filament to exhibit good interfacial strength. In some embodiments, nylon 6 or nylon 6,6 may be paired with unsized carbon fiber. In an exemplary embodiment, PEKK resin may be paired with unsized carbon fiber.

In some other embodiments, the reinforcing fibers may be aramid (e.g. Nomex®, Kevlar®), metals, glass, silicon carbide, zirconium oxide, or aluminum oxide. Persons skilled in the art will understand that other suitable reinforcing fibers may also be used. In some embodiments, different warp filaments with different reinforcing fibers and/or resins may deposited. In some embodiments, all the warp filaments in a warp group may be same. In other embodiments, the warp filaments in a warp group may be different.

In some other embodiments, the filament may include a thermoset resin. In these embodiments, the thermoset resin is uncured during deposition. The resin is cured after deposition, resulting in bonding between the warp and weft filaments. In some embodiments, the resin may be selectively cured during each step in the deposition sequence. In some other embodiments, the resin of an entire layer may be cured simultaneously. In some embodiments, the resin may be cured by UV light. In some other embodiments, the resin may be cured by applying heat. In these embodiments, the heat may be applied by conduction, convection, radiation, or any combination of the three.

In some embodiments, the filaments may include comingled thermoplastic resin fibers and reinforcing fibers instead of reinforcing fibers pre-impregnated or pre-coated with resin. In these embodiments, the resin is melted during the deposition process and wets the reinforcing fibers at that time.

In some embodiments, the filament used may be a singlepolymer thermoplastic fiber or yarn of multiple thermoplastic fibers. In these embodiments, the resin is not melted during deposition. Instead, the warp and weft are melted and fused where they interlace after deposition. This may occur locally (for example by laser or heated roller) or an entire layer may be fused by passing a heat source over it. This process may be desired if a lightweight component is desired with lower stiffness than would be produced by a reinforced composite.

Warp Deposition

Figure 9:
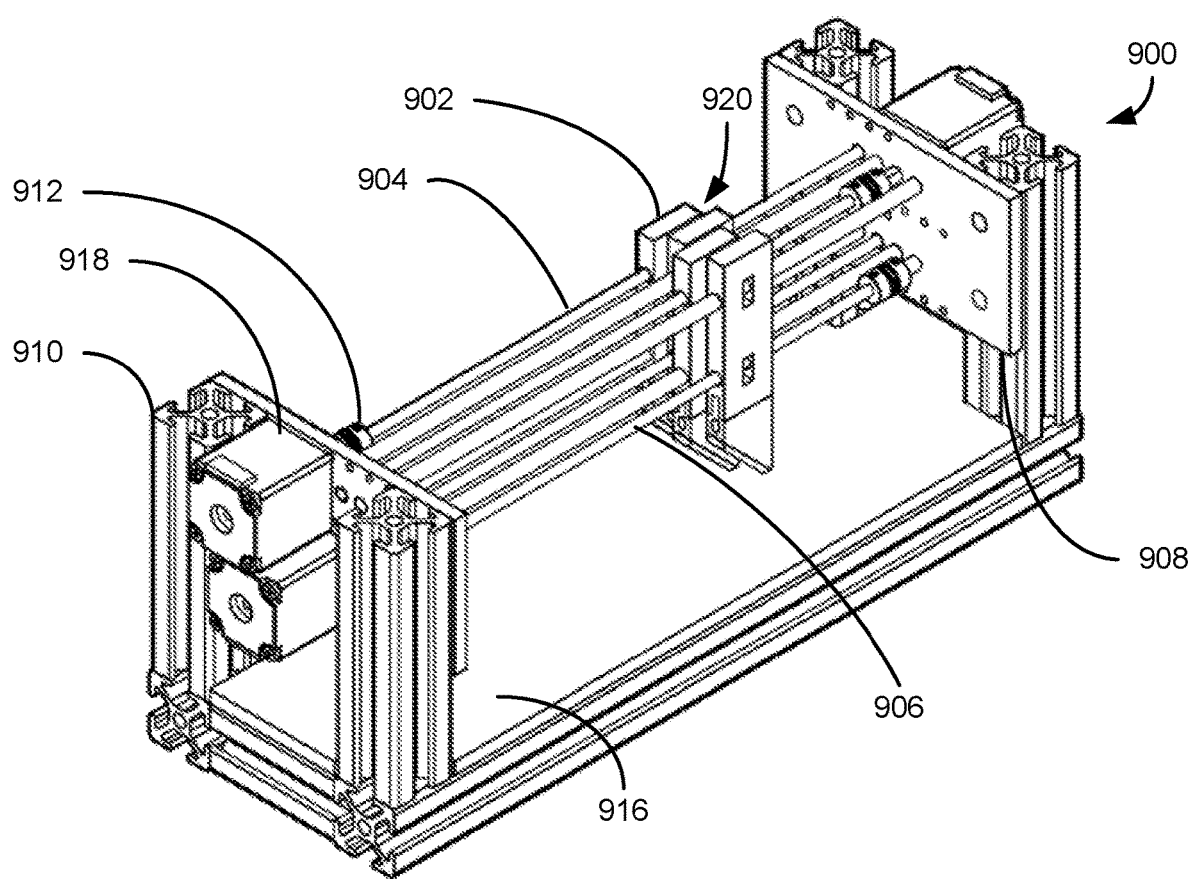
FIG. 9 is a schematic illustrating a simplified version of a 3D interlaced composite printer in accordance with the present disclosure.

The mechanical system of the composite printer can be considered a combination of a jacquard loom and an FDM printer. Referring now to FIG. 9, which illustrates a simplified version of the composite printer 900, the base unit of the printer is the warp print head 902 (warp head), which deposits the warp filaments on a print plate 916. Multiple warp heads may be incorporated into a warp rack 920. A weft inserter (not shown) allow the weft to be woven into the warp filaments extruded from each warp head 902. As described above, the warp heads 902 in the warp rack 920 move relative to each other between weft insertions to control the weave geometry.

In one embodiment, the warp heads 902 are each supported by a guide rod 906 and a lead screw 904. The lead screw 904 also drives the motion of the warp heads 902. The lead screws 904 and guide rods 906 are supported by end plates 908. The end plates 908 and the print plate 916 are supported by a frame 910. Each lead screw 904 is driven by a motor 918. In some embodiments, the lead screws 904 and guide rods 906 may be alternated from the top to bottom position in alternating warp heads 902 to accommodate a more tightly packed warp heads 902. In another embodiment, additional mounted plates 908 may be provided farther back from the printing space to accommodate additional motors 918 connected to longer lead screws 904. These embodiments also allow higher warp-head densities. In some embodiments, the lead screw 904 may be connected to the motor 918 through a flexible coupling 912. In some embodiments, the non-driven end of the lead screw 904 may be supported by a floating bearing to prevent binding. In some embodiments, motor and/or lead screw may be fitted with an encoder to indicate the position of the warp head 902 to a control device. In some embodiments, the motors may be stepper motors. In some other embodiments, the motors may be servo motors, direct-current motors, or alternating-current motors, as may be understood by one having ordinary skill in the art.

In some other embodiments, the warp heads 902 may be supported by one or more beams or by multiple guide rods, as may be understood by one having ordinary skill in the art. In further embodiments, the warp heads 902 may be driven by linear motors, chains, belts, pneumatics, or hydraulics, as may be understood by one having ordinary skill in the art.

Figure 10:
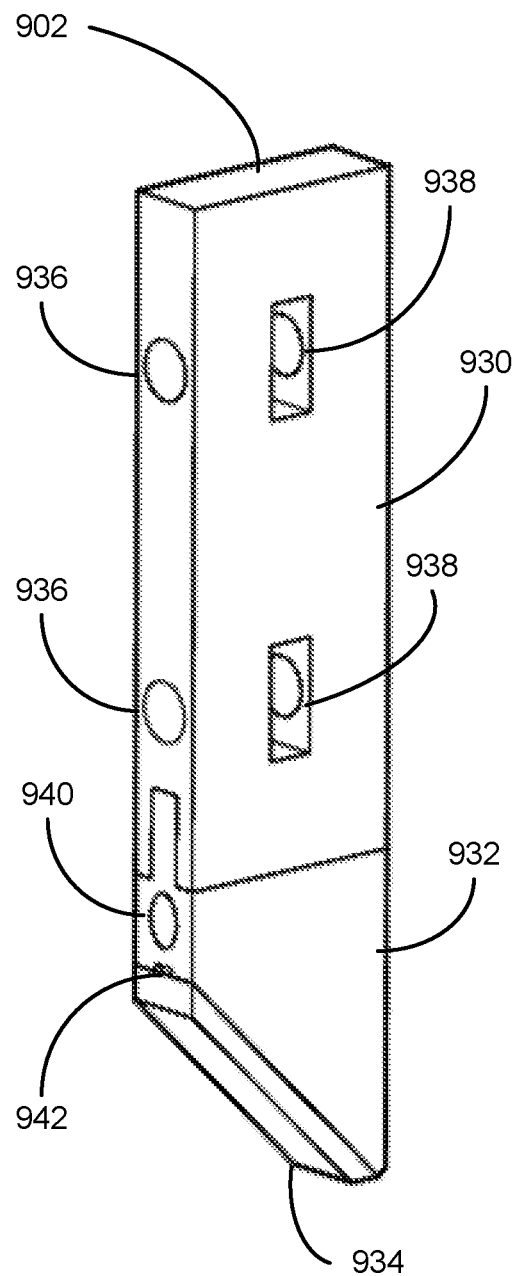
FIG. 10 is a schematic illustrating one embodiment of a warp print head, in accordance with the present disclosure.
Figure 11:
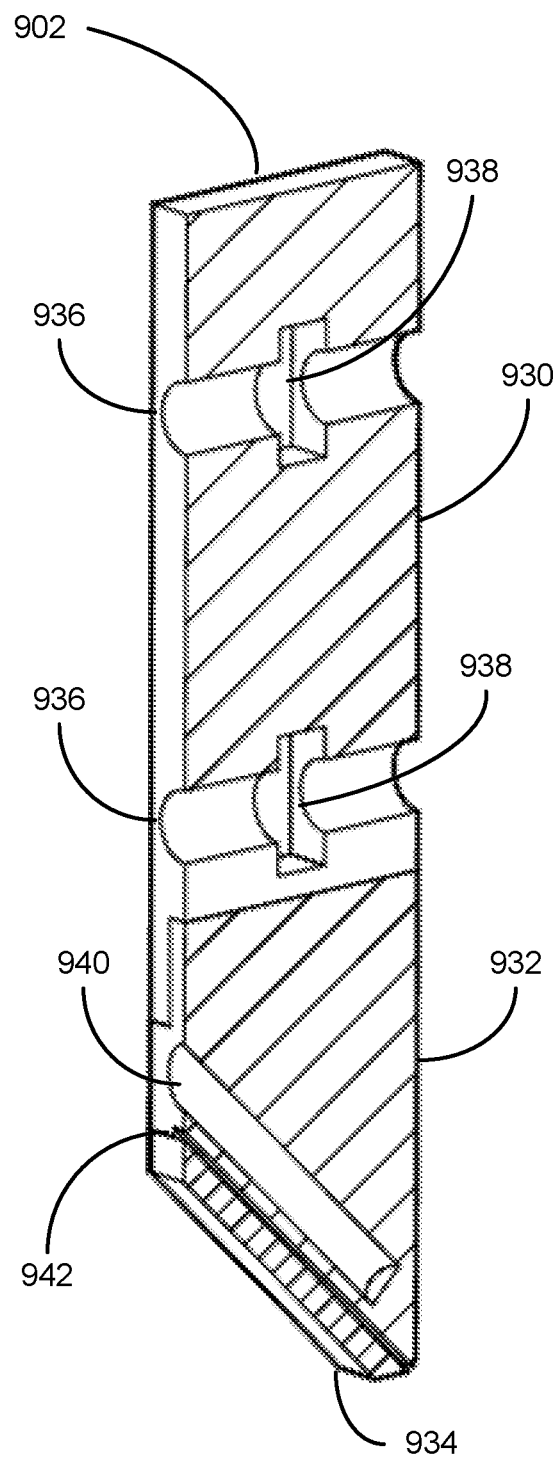
FIG. 11 is a schematic illustrating a cross-section of one embodiment of a warp print head, in accordance with the present disclosure.

FIGS. 10 and 11 respectively illustrate one embodiment of a warp head 902 and a cross-section of that warp head 902. The warp head 902 includes a motive section 930, a heater section 932, and a cover plate 934. In this embodiment, a combination of lead screws, bearings, and guide rods drives the warp head 902 through the motive section 930. In the simplest configuration, the motive section 930 includes two through holes 936 for the guide rod 906 and the lead screw 904, respectively. Two transverse holes 938 allow mounting of a ball screw for the lead screw 904 or a linear bearing for the guide rod 906. As the motor 918 turns, the lead screw 904 transfers the rotational motion into linear motion, while the guide rod 906 serves to prevent the warp head 902 from rotating. Self-aligning bearings are used to prevent the warp head 902 from binding with the guide rod.

In one embodiment, the composite filament enters the warp head in the solid state, where it is heated and extruded. The heater section 932 mates to the cover plate 934. The heater section includes a cavity for a heating element 940. In one embodiment, the heating element may be a ceramic cartridge heater. In other embodiments, the heating element may another resistive element, such as nichrome wire, or an inductive coil, as will be understood by one having ordinary skill in the art. The filament to be deposited travels through a channel 942 between the heater section 932 and the cover plate 934. In some embodiment, the warp head 902 may not have a heater section 932. In some of these embodiments, the thermoplastic resin of the filament may be melted remotely as it is deposited, for example by a laser.

The warp filament is preferably supplied from a reel (not shown). The reel is preferably stationary, and mounted remotely from the warp head 902. The filament should be kept under tension to control its placement. In one embodiment, a roller (not shown) on the warp head applies pressure against the print plate 916 to create tension on the filament during deposition. The tension pulls the filament off a tensioned reel (not shown). This may be described as a "filament pulling" system. In another embodiment, the "filament pushing" system, pair of powered rollers (not shown) pulls the filament off the reel and forces it into tube (not shown) which guides the filament to the warp head 902. This embodiment is like the drive system of a MIG welder for delivering the welding wire to the torch, as will be understood by one having ordinary skill in the art. The overall force on the filament during the extrusion process is a combination of tension on the filament embedded in the molten filament and pressure in the warp head. In another embodiment, tension in the filament can be controlled by varying the torque on the lead screw 904.

Figure 12:
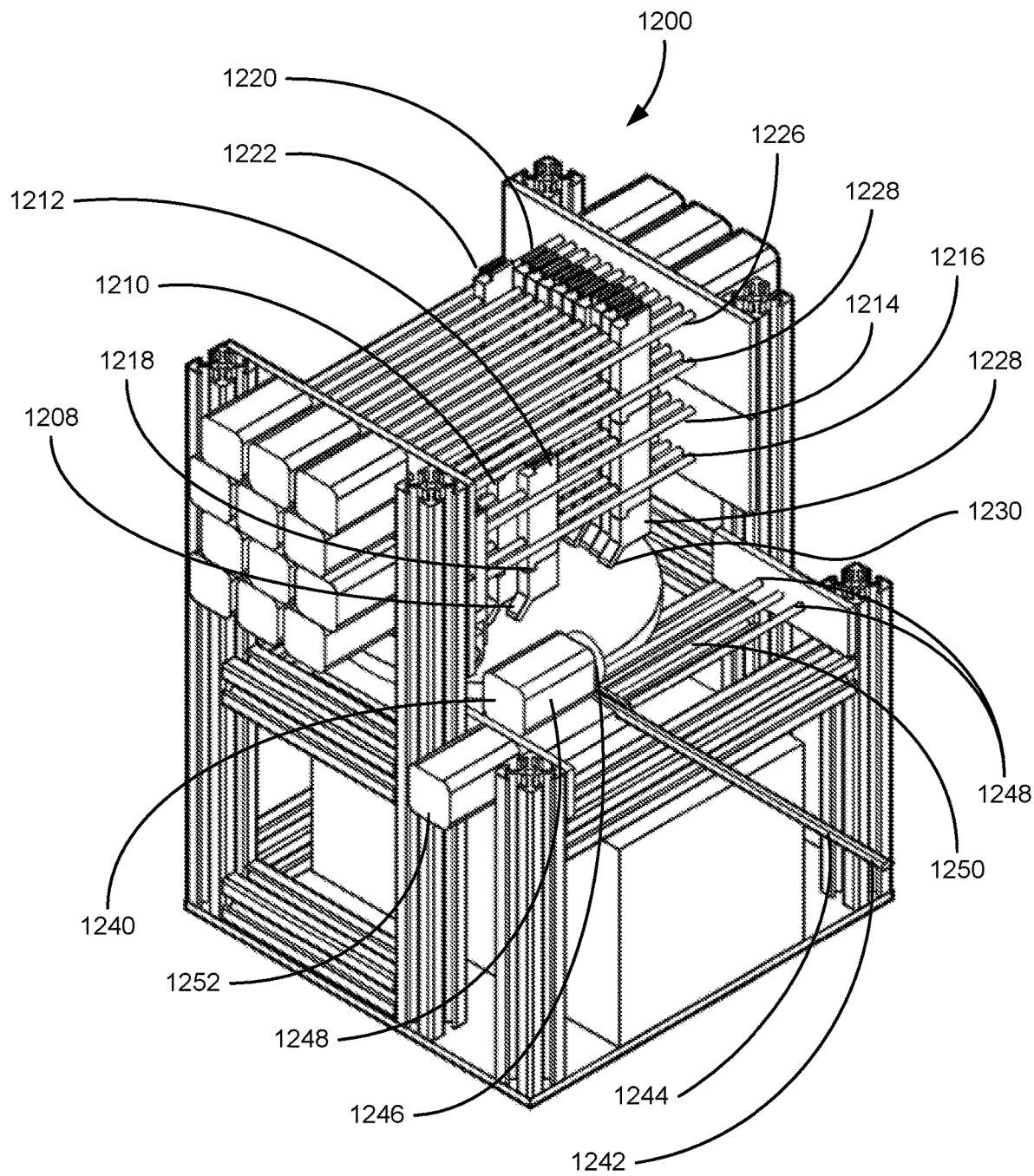
FIGS. 12 and 13 are schematics illustrating a more sophisticated embodiment of a 3D interlaced composite printer in accordance with the present disclosure.
Figure 13:
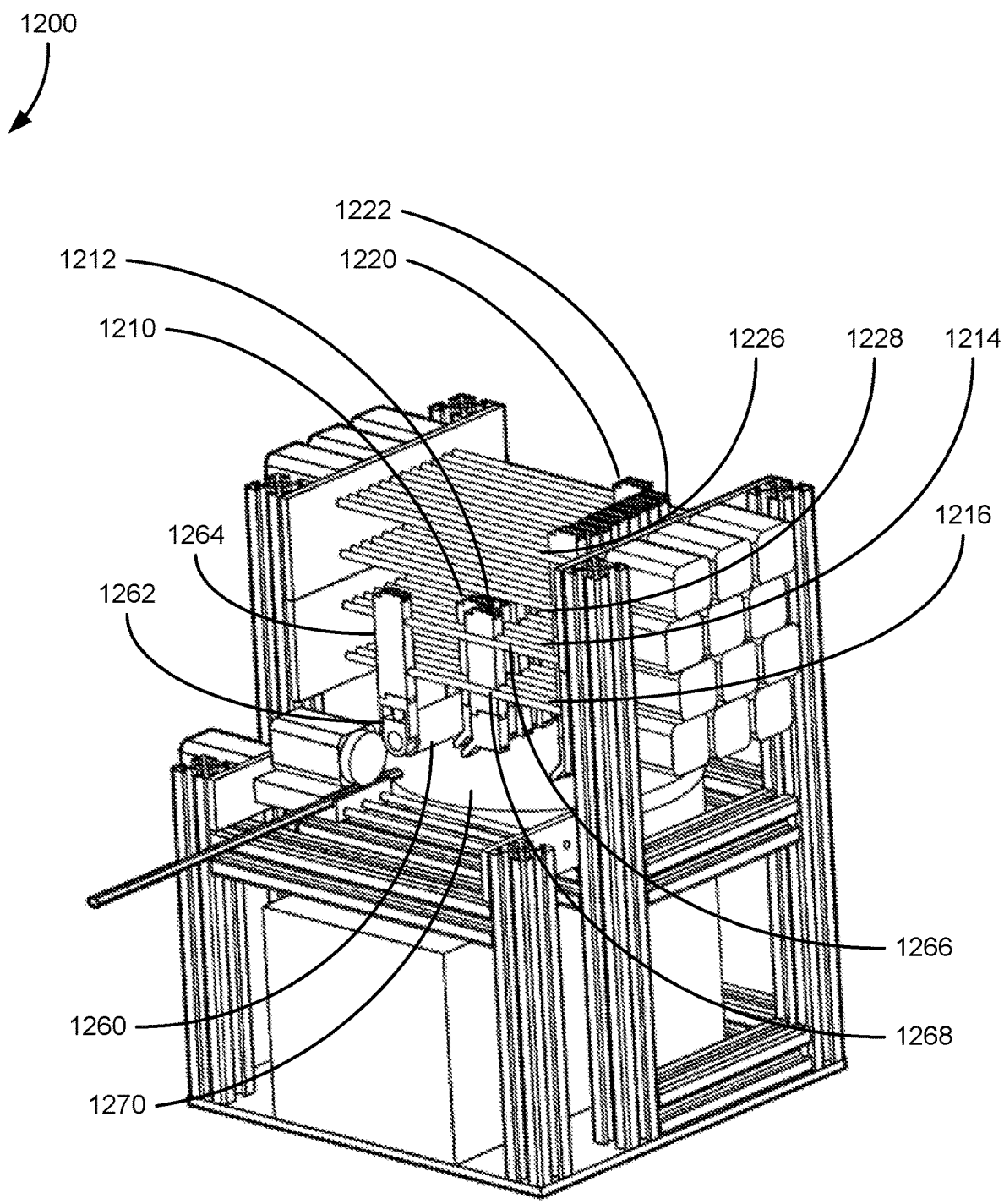

FIGS. 12 and 13 illustrate two views of a more sophisticated printer 1200. More complex 3D composite structures can be achieved by adding additional warp racks to the printer 1200. In this embodiment, there is a primary warp rack 1210 and a secondary warp rack 1220. The primary warp rack 1210 operates as described above. The warp heads 1222 on the secondary warp rack 1220 have their own guide rods 1224 and lead screws 1226, positioned above the guide rods 1214 and lead screws 1216 for the primary warp rack 1210. The guide rods 1214 and lead screws 1216 for the primary warp rack 1210 pass through the lower portion of the secondary warp heads 1222 on bearings that allow the secondary warp heads 1222 to move independently of the primary warp heads 1212. The heating element 1228 and extruder 1230 of the secondary warp heads are position at the same height as the heating element 1218 and extruder 1208 of the secondary warp heads. As described above, additional warp racks allow deposition of multiple layers of composite in a single pass. They also allow interlacing between layers, as described above.

Print Plate

The print plate 916, 1270 is a component of the printer system. In one embodiment, the print plate 916 moves solely in the vertical ("Z") axis. As each layer of composite is completed, the print plate 916 drops down so that a new layer can be deposited on top of the previous later.

A more sophisticated print plate 1270 is shown in FIGS. 12 and 13. In addition to moving in the Z axis, the print plate 1270 for this printer rotates about the Z-axis. This allows the fiber orientation to be changed between layers, which can provide beneficial material properties in the final composite part. In one embodiment, rotation about the Z axis is achieved by a planetary gear configuration on the underside of the print plate. In this embodiment, the planet carriers are fixed so that rotation of the sun gear results in rotation of the ring gear, as will be understood by those skilled in the art. As described above, the print plate 1270 also descends as layers are printed, which maintains a constant gap between the warp heads 1212, 1222 and the print plate 1270. The vertical motion may be achieved using lead screws, hydraulic or pneumatic lifts, linear actuators, or other means as will be understood by one having ordinary skill in the art.

In some embodiments, the print plate 1270 also moves in a direction transverse to the motion of the warp heads. This transverse motion allows deposition of warp filaments which is closer together than the center-to-center distance between the warp heads. For example, in one embodiment, after a layer is completed, the print plate 1270 can move transversely by an amount equal to one-half the pitch between the warp heads and repeat the layer. This technique results in a higher warp density than repeating the warp filaments on top of one another, because the second-layer warp filaments will "settle" in the spaces between the first-layer warp filaments.

In some embodiments, the print plate 1270 also rotates about axes orthogonal to the Z axis. In these embodiments, the print plate can tilt, allowing the creation of more complicated three-dimensional composite structures. In an exemplary embodiment, the print plate can move linearly in three orthogonal directions and rotate about three axes parallel to those directions.

In some embodiments, the print plate 1270 will be heated during the printing process. This controls the cooling rate of the thermoplastic resins. In one embodiment, the print plate 1270 may be heated by a resistive heating element embedded into the print plate. Unlike the warp heads 1212, 1222, which require an operating temperature above the melt temperature of the thermoplastic matrix, the print plate 1270 operates below the melt temperature and therefore requires less precise temperature control than the warp heads. In other embodiments, the print plate may be heated by a heated fluid, such as water or a water-glycol mixture, or by steam. As will be understood by one skilled in the art, many methods for controlling the temperature of thermoplastic molds may be used to control the temperature of the print plate 1270.

In some embodiments, the print plate 1270 may be treated with a permanent surface treatment, such polytetrafluoroethylene (PTFE), to promote releasing the final composite part. In other embodiments, the print plate 1270 may be treated before each part with a temporary release agent, for example a silicone fluid, as will be understood by one having ordinary skill in the art.

Compression Roller

In some embodiments, the printer may include a compression roller 1260. In these embodiments, the compression roller 1260 compresses the interlaced composite structure between deposition of layers. In some embodiments this provides greater consistency in the final composite part. In other embodiments, the compression roller 1260 may be heated. The heating may serve one or more purposes: (1) controlling the cooling of the molten thermoplastic resin in the filaments; (2) melting, or re-melting, the thermoplastic resin to ensure a high-quality bond between the composite filaments (including without limitation warp-to-weft bond and layer-to-layer bond); and (3) curing thermoset resins in composites that employ them.

In one embodiment, the compression roller 1260 has a pair of motive sections 1264 which are driven by at least two lead screws 1266 and two or more guide rods 1268. The lead screws 1266 drive the motive sections 1264 which in turn carry the compression roller 1260 with them. In certain embodiments, the compression roller 1260 may incorporate one or more drive motors 1262. In some embodiments, the drive motor(s) 1262 may provide all the motive power and the motive sections may run on four guide rods 1268. In other embodiments, the drive motor(s) 1262 work in concert with the lead screws 1266 to move the compression roller 1260s.

Weft Insertion

The weft inserter should be able to start and end each insertion completely outside of the print space, to allow the warp heads to move between insertions. FIGS. 12 and 13 also illustrate one embodiment of a weft insertion system 1240. In this embodiment, the weft is inserted by a rack-and-pinion rapier 1242. In one embodiment, the rapier 1242 includes a rack 1244 (a series of linear gear teeth) which is driven by a matching geared pinion 1246, as will be understood by one skilled in the art. In another embodiment, the rack 1244 may be a smooth-walled track driven by a smooth rubber wheel as the pinion 1246. The pinion 1246 is driven by a motor 1248. As the pinion 1246 turns counterclockwise, the rapier 1242 extends into the print space 1244, carrying the weft filament with it. In this embodiment, the rack 1244 and rapier 1242 are stiff. In one embodiment, the weft filament is drawn from a tensioned spool (not shown) by the insertion motion. In an exemplary embodiment, the pinion 1246 then reverses and turns clockwise to withdraw the rapier 1242, depositing the weft as the rapier 1242 is withdrawn. The weft is then cut (see below for cutting techniques) near the pinion 1246. In another embodiment, the weft is deposited during the insertion of the rapier 1242 and the weft is cut after being inserted to the proper distance. The pinion 1246 then reverses and turns clockwise to withdraw the rapier 1242.

In one embodiment, the weft is not melted during insertion, because the molten warp filaments will bond to the weft when they are deposited. In another embodiment, a heating module (not shown) may be added to the end of the rapier to deposit molten weft filament. In another embodiment, the rapier 1242 may be a flexible metal tape driven by a sprocket or drive roller, as will be understood by those skilled in the art.

In this embodiment the entire weft insertion system 1240 travels the length of the print space in the same direction as the warp heads 1204, 1296. This allows insertion of the weft at the proper location. In one embodiment, the weft insertion system 1240 rides on two guide rails 1248 and is driven by a lead screw 1250 and motor 1252. In other embodiments, the weft insertion system may be driven by linear motors, chains, belts, pneumatics, or hydraulics, as may be understood by one having ordinary skill in the art.

Figure 14:
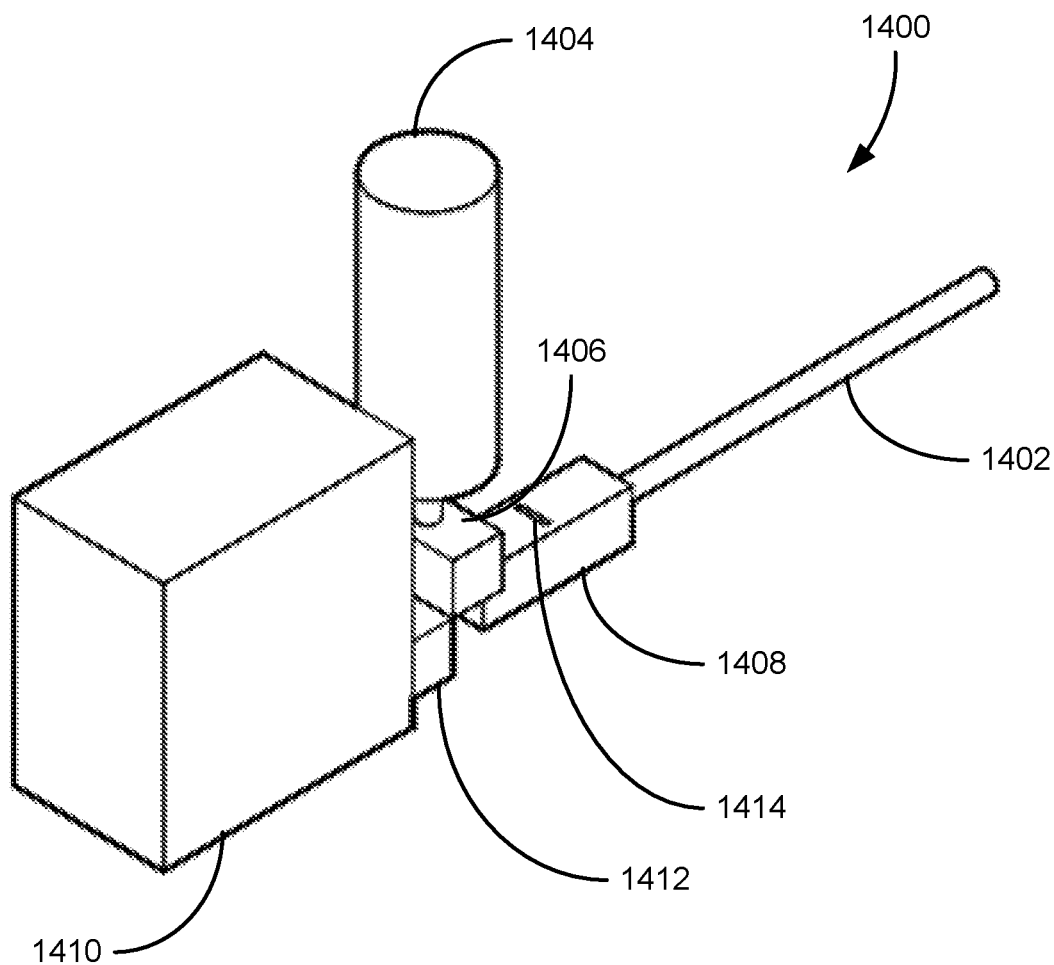
FIG. 14 is a schematic illustrating one embodiment of an air-jet weft insertion system, in accordance with the present disclosure.

FIG. 14 illustrates another embodiment of a weft insertion system. In this embodiment, the air jet insertion system 1400, a pulse of compressed air ejects a pre-cut weft filament to inset it between warp filaments. The air jet insertion system 1400 should travel the length of the print space in the same direction as the warp heads 1204, 1296, as with the rapier insertion system. In this embodiment, the system includes a nozzle 1402, a compressed air reservoir 1404, a primary air valve 1406, a weft cutter 1408, a weft reel 1410, and a weft extruder 1412. During operations, the weft extruder 1412 draws weft filament from the weft reel 1410 and feeds it into the nozzle 1402 to the desired length. The weft cutter 1408 cuts the weft filament, for example by a blade through a cutter slot 1414. The weft extruder 1412 includes an air valve to prevent compressed air entered the weft reel 1410 housing. The weft extruder 1412 valve then closes and the primary air valve 1406 then opens for a controlled period, applying pressure the cut weft filament and expelling it from the nozzle 1402. Because the filament is pre-impregnated with resin, it retains sufficient stiffness to remain straight as it is ejected from the nozzle 1402. In an exemplary embodiment, the ejected weft filament stops when it strikes a stop plate (not shown) on the opposite side of the printing area. In one embodiment, the print plate is fixed. In another embodiment, the print plate can mover transversely to the warp heads to alter the final resting place of the ejected weft filament. As with the rapier weft insertion systems, the air jet weft insertions system 1400 should travel the length of the print space in the same direction as the warp heads to insert the weft in the same location. All the mechanisms discussed above for such motion are appropriate for the air jet weft inserter as well.

Filament Cutting

Figure 15:
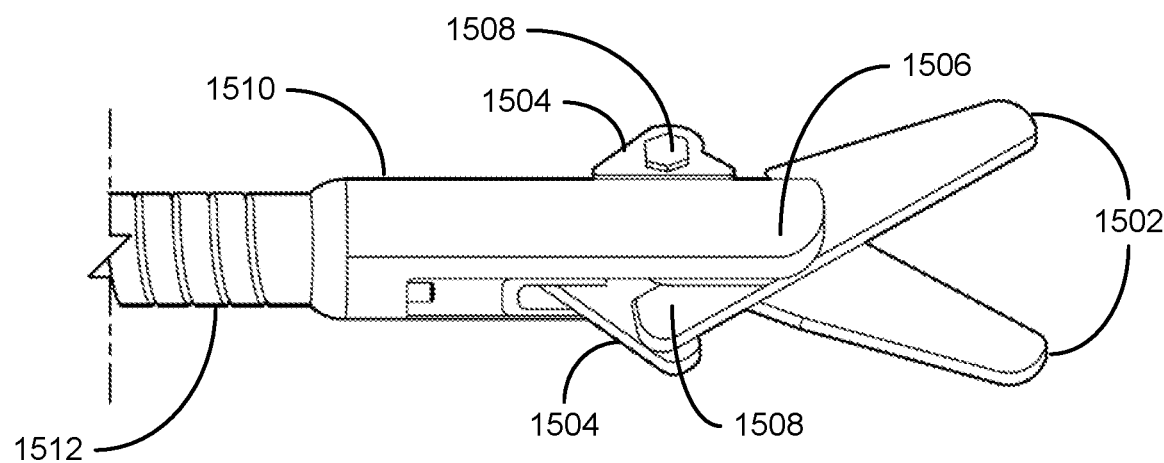
FIG. 15 is a schematic illustrating one embodiment of an extendable scissors cutting mechanism, in accordance with the present disclosure.

As noted above, the deposited warp and weft filaments should be cut once they reach the desired length. Several methods may be used to cut the filaments. In one embodiment, an extendable scissors may be used. FIG. 15 illustrates the cutting mechanism of one embodiment of the extendable scissors. In one embodiment, the cutting mechanism extends into the printing space on a rapier, like that used for the weft inserter. As with the weft inserter, the extendable scissor mechanism may be driven by a rack and pinion, linear motors, chains, belts, pneumatics, or hydraulics, as may be understood by one having ordinary skill in the art. The extendable scissors allow filaments to be cut independently, which enables more complicated shapes to be printed. For cutting warp filaments, the extendable scissors are mounted at the end of the printer and the rapier extends in the direction of warp motion to cut the filaments. In some embodiments, a single extendable scissor cutter may traverse across all the warp heads, cutting each warp filament individually. This simplifies control of the cutting and enables selective cutting of filaments, for example to create holes for fasteners without damaging the integrity of the composite. In another embodiment, each warp head may have its own extendable scissors. This embodiment provides higher operating speed for the machine. In another embodiment, a cutting system (such as the scissors) may be integrated into the warp heads to increase operating speed.

The cutting mechanism includes two cutting blades 1502, two levers 1504; a primary pivot 1506, two secondary pivots 1508, a frame 1510, and a hollow rapier 1512. The levers 1504 are connected to the cutting blades 1502 on one end at the secondary pivots 1508. The other ends of the levers 1504 are free. The cutting blades are rotatably fixed to the frame 1510 at the primary pivot 1506. During cutting operation, a wire or rod (not shown) within the hollow rapier 1512 pulls on the free ends of the levers 1504, drawing them away from primary pivot. The pulling force tends to pull the secondary pivots 1508 and the ends of the cutting blades 1502 toward the hollow rapier 1512. This imparts a moment on the cutting blades 1502 which rotate about the primary pivot 1506, causing a cutting action.

Figure 16:
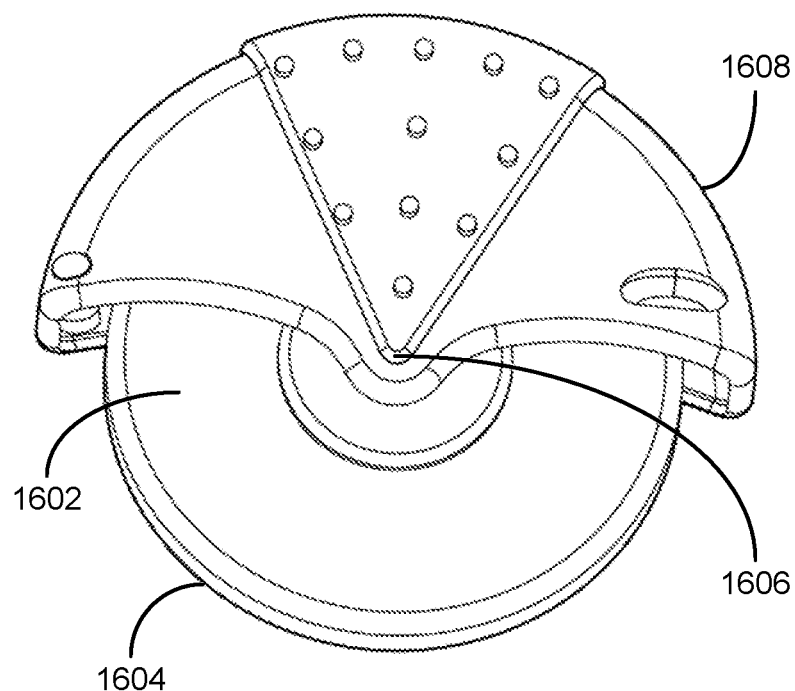
FIG. 16 is a schematic illustrating one embodiment of a rotary cutting mechanism, in accordance with the present disclosure.

In another embodiment, a rotary cutter may be used to cut the filaments. FIG. 16 illustrates one embodiment of a roller cutter. The roller cutter includes a rotary blade 1602, a pivot 1606, and a housing 1608. The rotary blade has a sharpened, ground edge 1604. The rotary cutter is mounted on the end of an extendable arm. Unlike the rapier used for the weft insertion or the extendable scissors, the arm for the rotary cutter should be fairly robust because it should be stiff enough to provide down force for cutting.

In operation, the arm extends into the printing space transversely to the filaments to be cut. For example, to cut warp filaments, the rotary cutter extends into the cutting space in a direction transverse to the motion of the warp heads. The arm provides a down force between the printing plate 916, 1270 and the rotary blade 1602. As the rotary blade 1602 passes over each filament, the filament is severed between the rotary blade 1602 and the printing plate 916, 1270. Although the distance to which the rotary cutter is extends is controlled, it will cut all the filaments it passes over. Therefore, composite structures with complicated edge geometries should be carefully positioned within the cutting space so that the rotary cutter can cut all the filaments needed, without cutting unwanted filaments. This limitation means that the rotary cutter is unsuitable for composite structures to be printed with holes in their interiors.

Figure 17:
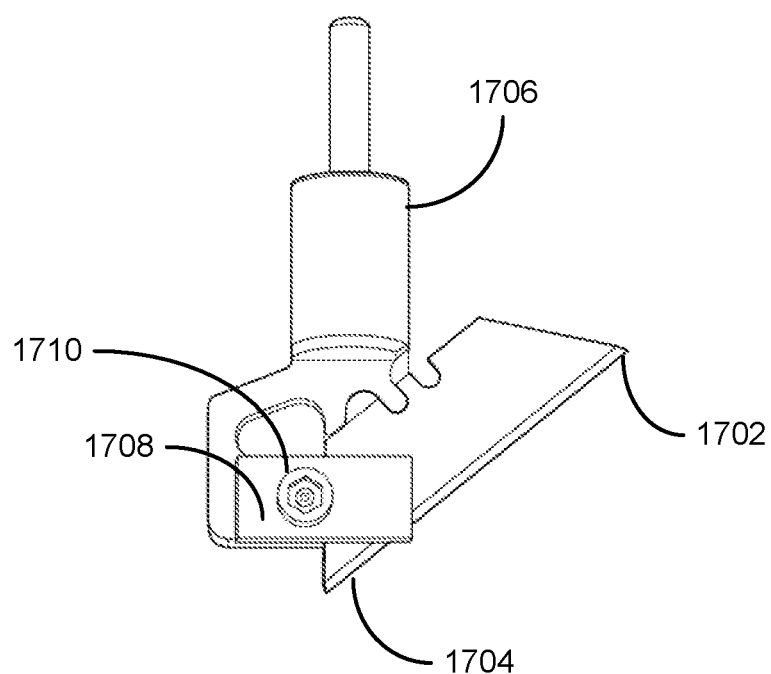
FIG. 17 is a schematic illustrating one embodiment of a drag knife cutting mechanism, in accordance with the present disclosure.

In another embodiment, a drag knife style cutter may be used to cut the filaments. FIG. 17 illustrates one embodiment of a drag knife cutter. The drag knife includes a blade 1702 with a cutting point 1704, a frame 1706, a blade chuck 1708. The blade chuck 1708 holds the blade 1702 securely against the frame 1706. The blade chuck 1708 is held by a screw 1710. In one embodiment, the blade 1702 may be a standard utility-knife blade. In another embodiment, the blade may be a sharpened cutter made from high speed steel, tungsten carbide, diamond, sapphire, or another suitably hard material. A person having ordinary skill in the art will understand that other blade materials may also be appropriate, depending on the filament materials. The drag knife cutter is mounted to an extendable arm, like the rotary cutter. Like the rotary cutter, the extendable arm should be stiff enough to provide the necessary down force for cutting.

In operation, the arm extends into the printing space transversely to the filaments to be cut. For example, to cut warp filaments, the drag knife cutter extends into the cutting space in a direction transverse to the motion of the warp heads. The arm provides a down force between the printing plate 916, 1270 and the drag knife 1602. As the drag knife 1602 passes over each filament, the filament is severed between the drag knife 1602 and the printing plate 916, 1270. In one embodiment, the drag knife is fixed to the end of the arm, and has the same limitations as the rotary cutter. In another embodiment, an auxiliary actuator can lift the drag knife slightly from the cutting surface, allowing selective cutting of filaments as the drag knife passes across the print plate.

The design and functionality described in this application is intended to be exemplary in nature and is not intended to limit the instant disclosure in any way. Those having ordinary skill in the art will appreciate that the teachings of the disclosure may be implemented in a variety of suitable forms, including those forms disclosed herein and additional forms known to those having ordinary skill in the art. For example, one skilled in the art will recognize that executable instructions may be stored on a non-transient, computer-readable storage medium, such that when executed by one or more processors, causes the one or more processors to implement the method described above.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A three-dimensional interlaced composite fabricated by a machine comprising a frame, a deposition surface, a first set of two or more warp heads adapted to deposit a first set of warp filaments on the deposition surface in a first warp direction, and move parallel to one another within a first plane, a second set of two or more of warp heads adapted to deposit a second set of warp filaments on the deposition surface in a second warp direction, and move parallel to one another within the first plane, wherein the second set of warp heads do not move collinearly with the first set of warp heads, and a weft inserter adapted to deposit a first and second set of weft filaments on the deposition surface in a weft direction, and traverse a length of the deposition surface in the warp direction, wherein the weft direction is different than at least one of the first and second warp directions;
- wherein the three-dimensional interlaced composite is fabricated by the machine by:
  - depositing onto the deposition surface the first set warp filaments;
  - inserting, on top of the first set of warp filaments, the first set of weft filaments being parallel to one another and substantially coplanar;
  - depositing, on top of the first set of weft filaments, the second set of warp filaments; and
  - inserting, on top of the second set of warp filaments, the second set of weft filaments being parallel to one another and substantially coplanar;
- wherein the three-dimensional interlaced composite is formed when at least one of the warp filaments passes over at least one of the weft filaments and passes under at least another of the weft filaments; and
- wherein the three-dimensional interlaced composite comprises:
  - the first and second set of warp filaments; and
  - the first and second set of weft filaments;
  - wherein one or more of the warp filaments of the first and second set of warp filaments comprise reinforcing fibers that are pre-impregnated and therefore saturated with resin.

2. The three-dimensional interlaced composite of claim 1, wherein the three-dimensional interlaced composite is formed when at least one warp filament of the first set of warp filaments passes over at least one weft filament of the first set of weft filaments and passes under at least another of the weft filaments of the first set of weft filaments.

3. The three-dimensional interlaced composite of claim 1, wherein the three-dimensional interlaced composite is formed when at least one warp filament of the first set of warp filaments passes over at least one weft filament of the second set of weft filaments and passes under at least another of the weft filaments of the second set of weft filaments.

4. An interlaced composite component comprising:
- two or more warp filaments parallel to each other; and
- two or more weft filaments parallel to each other;
- wherein one or more of the warp filaments comprise reinforcing fibers that are pre-impregnated and therefore saturated with resin;
- wherein at least a portion of the warp filaments are interlaced with at least a portion of the weft filaments at locations of interlacing;
- wherein at least a portion of the locations of interlacing, the interlaced warp filament and the interlaced weft filament are bonded to one another only at such portions of locations of interlacing;
- wherein at least a portion of the warp filaments and at least a portion of the weft filaments are interlaced in at least two different weave patterns selected from the group consisting of plain weave, twill weave, and satin weave;
- wherein at least a portion of the warp filaments and at least a portion of the weft filaments are continuous and the weave patterns transition from one pattern to another; and
- wherein each location of bonding of the interlaced composite component is a location of interlacing.

5. The interlaced composite component of claim 4, wherein at least a portion of the warp filaments comprise reinforcing fibers bonded to a polymer matrix.

6. The interlaced composite component of claim 4, wherein the resin is a thermoplastic resin.

7. The interlaced composite component of claim 4, wherein at least a portion of the warp filaments and at least a portion of the weft filaments comprise comingled reinforcing fibers and thermoplastic fibers.

8. The interlaced composite component of claim 4, wherein at each location of interlacing, the interlaced warp filament and the interlaced weft filament are bonded to one another.

9. An interlaced composite component comprising:
- a first set of warp filaments at least a portion of which are parallel to each other;
- a first set of weft filaments at least a portion of which are parallel to each other;
- a second set of warp filaments at least a portion of which are parallel to each other; and
- a second set of weft filaments at least a portion of which are parallel to each other;
- wherein at least a portion of the weft filaments of the first set of weft filaments are substantially coplanar;
- wherein at least a portion of the weft filaments of the second set weft filaments are substantially coplanar, and positioned either directly above or directly below at least a portion of the first set of weft filaments;
- wherein at least a portion of the warp filaments of the first set of warp filaments alternate between being interlaced with, and bonded to, at least a portion of the weft filaments of the first set of weft filaments and at least a portion of the weft filaments of the second set of weft filaments;
- wherein at least a portion of the warp filaments of the second set of warp filaments alternate between being interlaced with, and bonded to, at least a portion of the weft filaments of the first set of weft filaments and at least a portion of the weft filaments of the second set of weft filaments; and
- wherein either or both:
  - in at least a portion of the composite, weft filaments of both the first set of weft filaments and the second set of weft filaments remain unbonded from one another; and
  - at least a portion of the warp filaments of the second set warp filaments are positioned either directly above or directly below at least a portion of the first set of warp filaments.

10. The interlaced composite component of claim 9, wherein either or both:
   at least a portion of the warp filaments of the second set of warp filaments and at least a portion of the weft filaments of the second set of weft filaments are interlaced in at least two different weave patterns selected from the group consisting of plain weave, twill weave, and satin weave; and
   at least a portion of the warp filaments of the second set of warp filaments and at least a portion of the weft filaments of the second set of weft filaments are continuous and the weave patterns transition from one pattern to another.

11. An interlaced composite component comprising:
   a first set of two or more warp filaments parallel to each other and separated from one another by a warp gap; and
   a first set of two or more weft filaments parallel to each other and separated from one another by a weft gap;
   wherein at least a portion of the warp filaments of the first set of warp filaments are interlaced with at least a portion of the weft filaments of the first set of weft filaments at locations of interlacing;
   wherein at least a portion of the locations of interlacing, the interlaced warp filament of the first set of warp filaments and the interlaced weft filament of the first set of weft filaments are bonded to one another only at such portions of locations of interlacing;
   wherein the warp and weft gaps define one or more openings in the composite component configured to one or both limit crack propagation and buckling;
   wherein each location of bonding of the interlaced composite component is a location of interlacing;
   wherein at least a portion of the warp filaments of the first set of warp filaments comprise reinforcing fibers that are pre-impregnated and therefore saturated with resin; and
   wherein at least a portion of the weft filaments of the first set of weft filaments comprise reinforcing fibers that are pre-impregnated and therefore saturated with resin.

12. A composite component comprising:
   the interlaced composite component of claim 11; and
   a thermoplastic polymer;
   wherein all of the warp and weft filaments of the interlaced composite component comprise reinforcing fibers that are pre-impregnated and therefore saturated with resin; and
   wherein the thermoplastic polymer is molded over the interlaced composite component.

13. The composite component of claim 12, wherein the resin is a thermoplastic resin; and
   wherein the thermoplastic polymer is reinforced with a discontinuous fiber.

14. An interlaced composite component comprising:
   warp filaments; and
   weft filaments;
   wherein either or both of the warp and weft filaments comprise reinforcing fibers that are pre-impregnated and therefore saturated with resin;
   wherein the warp filaments are interlaced with the weft filaments at locations of interlacing; and
   wherein at least a portion of the locations of interlacing, the interlaced warp filament and the interlaced weft filament are bonded to one another at such portions of locations of interlacing via activation of at least a portion of the resin of either or both the warp filament and the weft filament.

15. The interlaced composite component of claim 14, wherein all of the warp and weft filaments comprise reinforcing fibers pre-impregnated and therefore saturated with resin; and
   wherein the warp and weft filaments are each unbound, one from another, except at locations of interlacing.

16. The interlaced composite component of claim 14, wherein the resin is selected from the group consisting of a thermoplastic resin and a thermosetting resin; and
   wherein the activation of at least a portion of the resin comprises either melting the thermoplastic resin or curing the thermosetting resin.

17. An interlaced composite component comprising:
   first and second sets of warp filaments; and
   first and second sets of weft filaments;
   wherein one or more of the filaments of the warp and weft filaments comprise reinforcing fibers that are pre-impregnated and therefore saturated with resin;
   wherein at least a portion of the weft filaments of the first set of weft filaments are substantially coplanar;
   wherein at least a portion of the weft filaments of the second set weft filaments are substantially coplanar, and positioned either directly above or directly below at least a portion of the first set of weft filaments;
   wherein at least a portion of the warp filaments of the first set of warp filaments are interlaced with, and bonded to, at least a portion of the weft filaments of both of the first set and the second set of weft filaments;
   wherein at least a portion of the warp filaments of the second set of warp filaments are interlaced with, and bonded to, at least a portion of the weft filaments of both of the first set and the second set of weft filaments; and
   wherein either or both:
      in at least a portion of the composite, weft filaments of both the first set of weft filaments and the second set of weft filaments remain unbonded from one another; and
      at least a portion of the warp filaments of the second set warp filaments are positioned either directly above or directly below at least a portion of the first set of warp filaments.

18. The interlaced composite component of claim 17, wherein at least a portion of the warp filaments of the first set of warp filaments alternate between being interlaced with, and bonded to, at least a portion of the weft filaments of the first set of weft filaments and at least a portion of the weft filaments of the second set of weft filaments.

19. The interlaced composite component of claim 17, wherein at least a portion of the warp filaments of the second set of warp filaments alternate between being interlaced with, and bonded to, at least a portion of the weft filaments of the first set of weft filaments and at least a portion of the weft filaments of the second set of weft filaments.

20. The interlaced composite component of claim 17, wherein at least a portion of the warp filaments of either or both the first set and the second set of warp filaments and at least a portion of either or both the weft filaments of the first set and second set of weft filaments are interlaced in at least two different weave patterns selected from the group consisting of plain weave, twill weave, and satin weave.

21. The interlaced composite component of claim 20, wherein at least a portion of the warp filaments of either or both the first set and the second set of warp filaments and at least a portion of either or both the weft filaments of the first set and second set of weft filaments are continuous and the weave patterns transition from one pattern to another.

\* \* \* \* \*